United States Patent
Sokoll et al.

(10) Patent No.: US 8,275,520 B2
(45) Date of Patent: Sep. 25, 2012

(54) METHOD FOR OPERATING A BRAKE SYSTEM OF A MOTOR VEHICLE

(75) Inventors: Guenther Sokoll, Olching (DE); Toni Braeuer, Suzhou (CN); Simon Schilling, Ludwigsburg (DE); Christian Scheinost, Ergolding (DE)

(73) Assignees: Robert Bosch GmbH, Stuttgart (DE); Bayerische Motoren Werke AG, Munich (DE)

( * ) Notice: Subject to any disclaimer, the term of this patent is extended or adjusted under 35 U.S.C. 154(b) by 790 days.

(21) Appl. No.: 12/084,453

(22) PCT Filed: Oct. 19, 2006

(86) PCT No.: PCT/EP2006/067584
§ 371 (c)(1),
(2), (4) Date: May 28, 2009

(87) PCT Pub. No.: WO2007/051717
PCT Pub. Date: May 10, 2007

(65) Prior Publication Data
US 2009/0306860 A1     Dec. 10, 2009

(30) Foreign Application Priority Data
Nov. 2, 2005 (DE) .......................... 10 2005 052 160

(51) Int. Cl.
*B60R 22/00* (2006.01)
(52) U.S. Cl. ........................................................ 701/48
(58) Field of Classification Search ................... 701/48, 701/70, 77–80; 477/195, 197
See application file for complete search history.

(56) References Cited

U.S. PATENT DOCUMENTS

| 4,629,043 A | 12/1986 | Matsuo et al. |
|---|---|---|
| 6,702,405 B1 * | 3/2004 | Balz et al. ..................... 303/192 |
| 2007/0164608 A1 | 7/2007 | Streit et al. |

FOREIGN PATENT DOCUMENTS

| DE | 101 54 633 | 5/2003 |
|---|---|---|
| DE | 102 50 719 | 5/2004 |
| DE | 103 22 125 | 12/2004 |
| DE | 103 51 147 | 12/2004 |
| DE | 10/2004 04311 | 7/2005 |
| EP | 1 410 940 | 4/2004 |

* cited by examiner

*Primary Examiner* — Faye M. Fleming
(74) *Attorney, Agent, or Firm* — Kenyon & Kenyon LLP

(57) ABSTRACT

A brake system of a motor vehicle can activate a brake when an activation condition exists. The braking effect is reduced when a deactivation condition exists. It is suggested that at least one property of the reduction of the braking effect, e.g., the duration or the gradient of the reduction, be at least temporarily a function of a longitudinal inclination of the motor vehicle.

12 Claims, 3 Drawing Sheets

METHOD FOR OPERATING A BRAKE SYSTEM OF A MOTOR VEHICLE

FIELD OF THE INVENTION

The present invention relates to a method for operating a brake system of a motor vehicle. The subject matter of the present invention is also a computer program, an electrical storage medium, a control and/or regulating unit, and a motor vehicle.

BACKGROUND INFORMATION

Various methods, which may secure a vehicle in a specific position and prevent rolling of the vehicle, are known under the names "driving off assistant," "hill assistant," "hill hold," or "automatic hold." These methods are based on hydraulic, mechanical, or pneumatic electronically controllable brake systems. In all of these methods, for example, a brake is activated by actuating the brake pedal or the hand brake or via actuating elements connected thereto. The activation is performed via the same or also other aids (for example, a gas pedal, a clutch, etc.). Deactivation after elapse of a specific holding time is also known. If a deactivation condition exists, the braking effect is reduced until it is completely canceled. As a result, for example, a vehicle stopped on an inclined roadway accelerates, and does it at different rates as a function of the current roadway inclination.

A brake system having such a hill holder function is discussed, for example, in German patent documents nos. DE 103 22 125 A1 or DE 103 51 147 B3. In addition, DE 102 50 719 A1 discusses a system in which the holding time is a function of the longitudinal inclination of the motor vehicle, to thus provide more time to the driver for the driving off procedure on a steep hill.

SUMMARY OF THE INVENTION

An object of the exemplary embodiments and/or exemplary methods of the present invention is to increase the security and comfort during operation of a motor vehicle.

This object may be achieved by a method having the features described herein. Further possible options for achieving the object are found in the other independent claims, which relate to a computer program, an electrical storage medium, a control and/or regulating unit, and a motor vehicle. Advantageous refinements are also specified herein.

According to the exemplary embodiments and/or exemplary methods of the present invention, the current longitudinal inclination of the motor vehicle is taken into consideration when determining at least one property of the reduction of the braking effect. It is thus possible to influence the rolling away of the motor vehicle, which results due to the reduction of the braking effect, in such a way that the motor vehicle may be securely controlled by the driver even when it is stopped on a steep hill, and the risk of an accident due to a motor vehicle accelerating in an undesired way is reduced. The comfort is also improved, because the user of the motor vehicle has more time available, for example, to respond to the rolling away of the motor vehicle. In addition, the user of the motor vehicle is relieved insofar as he does not have to set the braking effect by an appropriate variation of the pressure on the brake pedal "by feel," but rather the motor vehicle displays predictable and reproducible roll-away behavior.

It is particularly advantageous if the property of the reduction of the braking effect is determined in such a way that the acceleration curve, the velocity curve, and/or the distance curve (each over time) is/are at least essentially independent of the longitudinal inclination. The user of the motor vehicle according to the present invention may thus always expect an essentially identical roll-away behavior independently of the longitudinal inclination of the motor vehicle, which improves the controllability of the vehicle, in particular when it has been stopped on a comparatively steep hill.

The property of the reduction of the braking effect, which is varied as a function of a longitudinal inclination of the motor vehicle, may be an extent and/or a duration and/or gradient and/or a curve of the reduction. The property may also follow a function curve. A dependence of at least one of these properties on the longitudinal inclination of the motor vehicle is simple to implement in a program and allows the implementation of roll-away behavior which is perceived as clear and comprehensible by the user of the motor vehicle.

The dependence may be representable by a linear characteristics curve or a characteristics curve having individual linear segments having different slopes, which is programmable in a comparatively simple manner. However, it is also possible to represent the dependence by an arbitrary, which may be parabolic characteristics curve having continuous slope, by which the roll-away behavior of the motor vehicle becomes even more independent of the longitudinal inclination.

A further improvement is achieved if the property is also a function of a current mass of the motor vehicle, an engine creep torque, a running resistance (air resistance and/or rolling resistance), and/or a mass moment of inertia of the motor vehicle and/or a mass moment of inertia of a part of the motor vehicle. In this way, the actual roll-away behavior may correspond even more precisely to a desired roll-away behavior.

However, there may be operating situations of a motor vehicle in which freely rolling down a hill is desirable. Such a situation may exist, for example, if a battery of the motor vehicle is dead and the engine is to be started by rolling down the hill and subsequently engaging the clutch. This is made possible by a refinement in which the braking effect may be automatically completely canceled after a specific time interval.

Exemplary embodiments of the present invention are explained in greater detail in the following with reference to the attached drawings.

DETAILED DESCRIPTION

Figure 1:
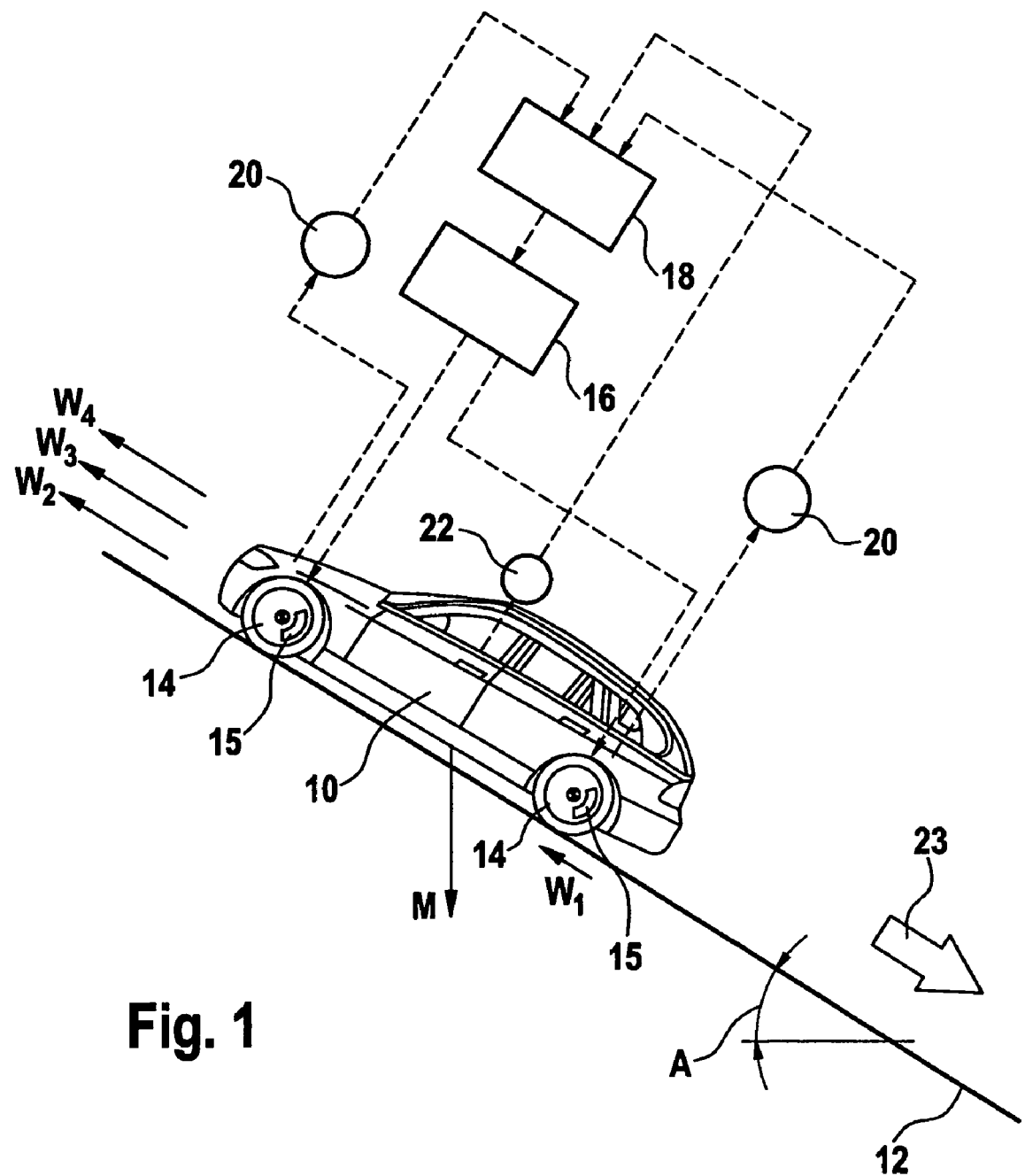
FIG. 1 shows a side view of a motor vehicle, which is stopped on a hill having longitudinal inclination, having a brake system and various physical variables.

A motor vehicle carries the reference numeral 10 as a whole in FIG. 1. It stands on a roadway 12, which is inclined in relation to the horizontal by an angle A. A brake system acting on wheels 14 using brakes 15 is identified in FIG. 1 by 16. It is activated and/or regulated by a control and/or regulating unit 18. For this purpose, the latter receives signals, for example, from wheel sensors 20 and an actuating element 22, such as a brake switch in the area of the dashboard of motor vehicle 10.

Figure 2:
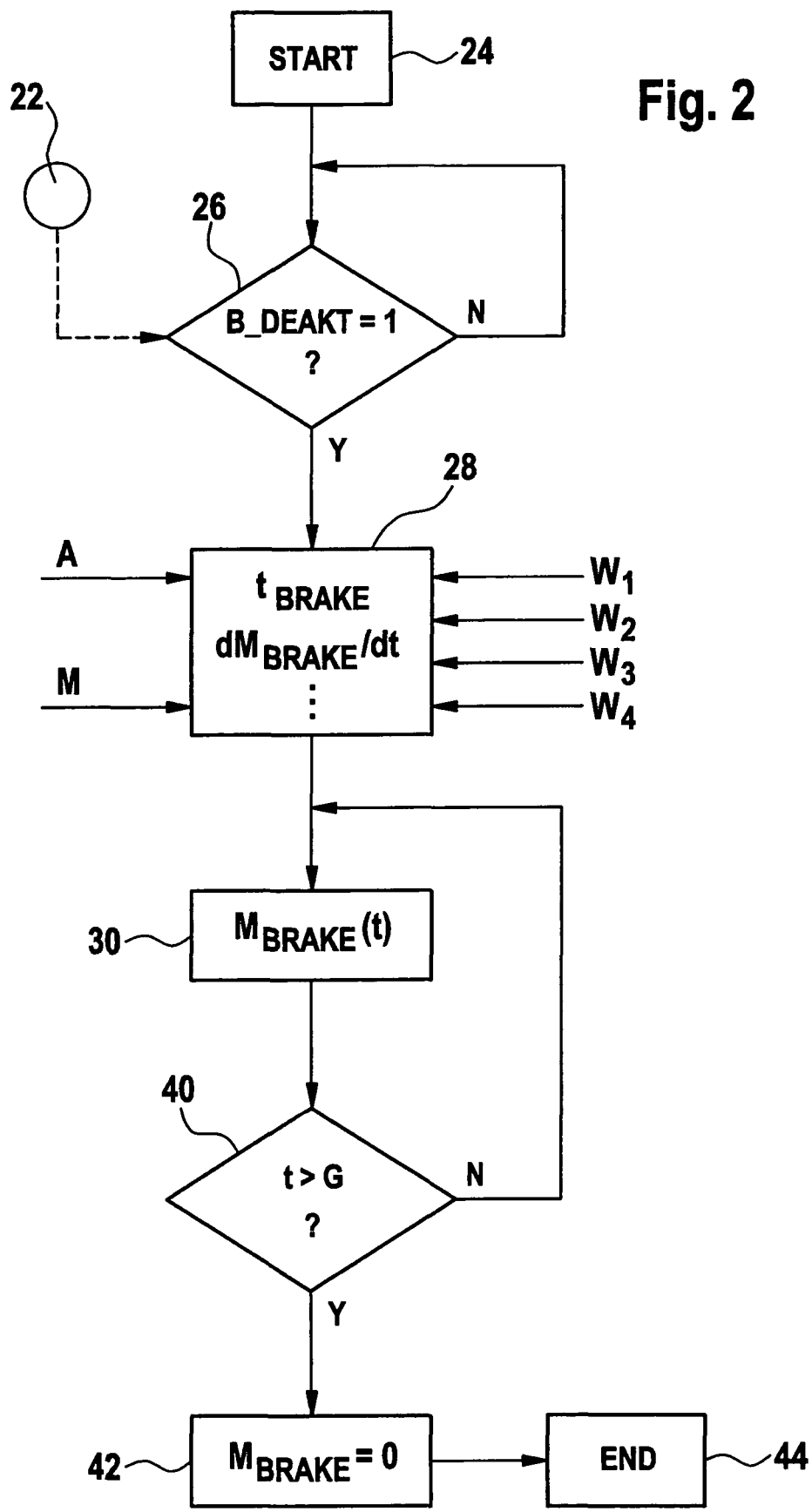
FIG. 2 shows a flow chart of a method for operating the brake system from FIG. 1.

A computer program is stored on an electrical storage medium (not shown) of control and/or regulating unit 18, whereby a "hill hold function" may be implemented: upon an actuation of actuating element 22, brake system 16 acting on brakes 15 and/or wheels 14 is activated, so that motor vehicle 10 remains stationary without further activity of the driver and at least initially does not roll backward down (arrow 23 in FIG. 1) steeply inclined roadway 12. Upon a deactivation of the hill hold function, a method is performed which will be explained with reference to FIG. 2 in particular:

After a start in 24, it is checked in 26 whether a deactivation bit B_DEAKT is set. Deactivation bit B_DEAKT is set, for example, by another actuation of actuating element 22. However, it is also possible that deactivation bit B_DEAKT is set as a function of the position of a gas pedal or a clutch of motor vehicle 10 or as a function of the drive torque of the engine of motor vehicle 10.

Further possible input variables are the activation state of a parking brake, of a door contact, of a belt contact, of a seat occupancy, etc. It is also conceivable that deactivation bit B_DEAKT is set when a specific holding time since the activation of brake system 16 has elapsed. Furthermore, a condition may be that no actuating unit of the motor vehicle is actuated.

If deactivation bit B_DEAKT is set, various input variables are processed in a processing block 28 and at least one property of a reduction of the braking effect is ascertained (see below in connection with FIGS. 3 through 6). A braking torque $M_{BRAKE}(t)$ that changes, specifically decreases over time, results in block 30 due to the type of reduction of the braking effect. The input variables which are used in the present exemplary embodiment in processing block 28 primarily include, above all, longitudinal inclination A of motor vehicle 10 established (or calculated or estimated) via sensors (not shown in FIG. 1). These variables also include a vehicle mass M, which is also ascertained on the basis of signals of sensors (not shown in FIG. 1). Further input variables are a roll resistance $W_1$, an air resistance $W_2$, a mass moment of inertia $W_3$ of motor vehicle 10, and an engine creep torque $W_4$. In simpler embodiments, significantly fewer input variables may also be used.

On the basis of these input variables, using characteristics curves and/or characteristic maps, the acceleration curve of motor vehicle 10 rolling away in reverse direction 23 is set by implementing time-variable braking torque $M_{BRAKE}(t)$ in such a way that it corresponds to a desired acceleration curve over time. For example, a constant acceleration may be set in such a way that it always has the same value, independently of longitudinal inclination A of motor vehicle 10. However, it is also possible to set the velocity curve and/or the distance curve accordingly by a variation of braking torque $M_{BRAKE}(t)$ in such a way that these are identical for every longitudinal inclination A of motor vehicle 10.

Figure 3:
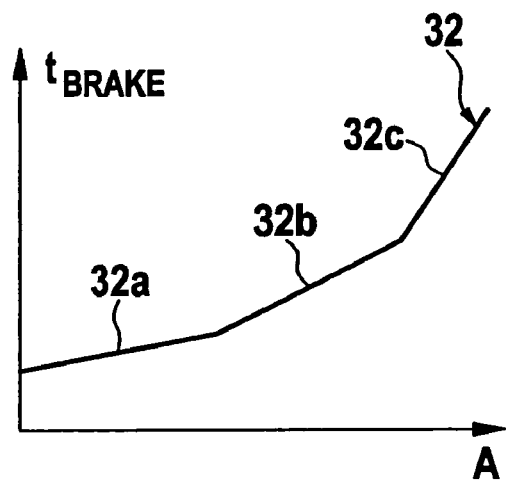
FIG. 3 shows a diagram in which a time from deactivation up to complete disengagement of a brake of the motor vehicle from FIG. 1 is plotted over the longitudinal inclination of the motor vehicle in a first exemplary embodiment.
Figure 4:
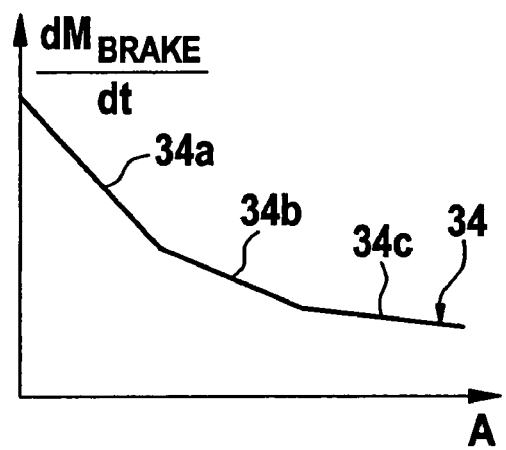
FIG. 4 shows a diagram in which a braking force gradient is plotted over a longitudinal inclination in the first exemplary embodiment.

Examples of the characteristics curves used in processing block 28 are shown in FIGS. 3 and 4. A time $t_{BRAKE}$ is plotted over longitudinal inclination A of motor vehicle 10 in FIG. 3. It may be seen that corresponding characteristics curve 32 is composed of individual linear segments 32a, 32b, and 32c, which have different slopes. The slope increases with longitudinal inclination A of motor vehicle 10. In a further simplified exemplary embodiment (not shown), the characteristics curve may also be expressed by only one single straight line. Value $t_{BRAKE}$ is the time which elapses from the beginning of the reduction of the braking effect (as soon as bit B_DEAKT is set) until complete reduction of the braking effect (i.e., no longer any braking effect). It may be seen from FIG. 3 that braking is performed longer the steeper the longitudinal inclination of motor vehicle 10 and/or roadway 12. In this way, similar or defined roll-away behavior of motor vehicle 10 is achieved even on differently inclined roadways 12.

Figure 5:
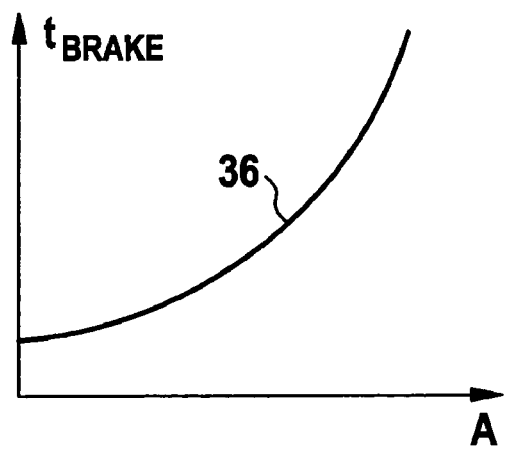
FIG. 5 shows a diagram similar to FIG. 3 for a second exemplary embodiment.
Figure 6:
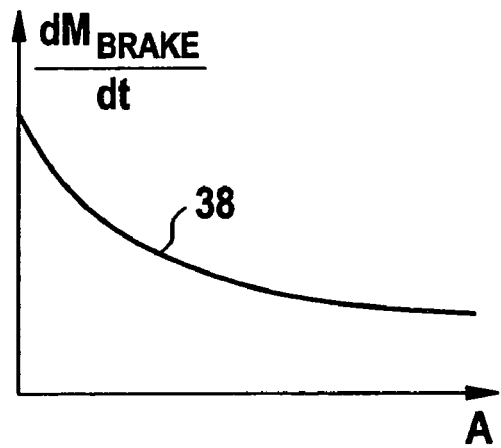
FIG. 6 shows a diagram similar to FIG. 4 of the second exemplary embodiment.

A similar situation applies to FIG. 4, in which a required braking force or braking torque gradient $dM_{BRAKE}/dt$ is also plotted over longitudinal inclination A of motor vehicle 10. This characteristics curve (reference numeral 34) is also divided into individual linear segments 34a, 34b, and 34c having different slopes. Only one single straight line may also be used here for simplification. It is obvious from FIG. 4 that the gradient is flatter, i.e., the reduction of the braking effect is thus weaker, the greater the longitudinal inclination A of motor vehicle 10. Characteristics curves 32 and 34 shown in FIGS. 3 and 4 are easily programmable. Greater programming effort is necessary, at simultaneously higher precision, if parabolic characteristics curves having continuous slope curves corresponding to FIGS. 5 and 6 are used (reference numerals 36 and 38).

In principle, it is possible that braking torque $M_{BRAKE}$ is reduced to zero at some time independently of the elapsed time. However, it is also possible that the following procedure is used: in a block 40 of the method shown in FIG. 2, time t since setting bit B_DEAKT is compared to a limiting value G. If limiting value G is exceeded, braking torque $M_{BRAKE}$ is automatically set to zero in block 42, i.e., braking is no longer performed, even if braking torque $M_{BRAKE}$ determined in blocks 28 and 30 would still be greater than zero. The independence of the acceleration behavior of motor vehicle 10 of longitudinal inclination A of roadway 12 which is forced in block 28 is thus canceled in block 42, so that free rolling of motor vehicle 10 is possible. The method ends in block 44.

What is claimed is:

1. A method for operating a brake system of a motor vehicle, the method comprising:
   activating a brake to provide a braking effect when an activation condition exists; and
   reducing the braking effect when a deactivation condition exists;
   wherein at least one property of the reduction of the braking effect at least intermittently is a function of a longitudinal inclination of the motor vehicle in order to influence a rolling away of the motor vehicle, this property being determined such that the motor vehicle displays a predictable and reproducible roll-away behavior.

2. The method of claim 1, wherein the at least one property is determined so that at least one of an acceleration curve, a velocity curve, and a distance curve is at least essentially independent of the longitudinal inclination.

3. The method of claim 1, wherein the property is at least one of an extent, a duration, a gradient, and a curve of the reduction.

4. The method of claim 1, wherein the function may be represented by one of a linear characteristics curve and a characteristics curve having individual linear segments having different slopes.

5. The method of claim 1, wherein the dependence is represented by an arbitrary characteristics curve having a continuous slope.

6. The method of claim 1, wherein the property is also a function of at least one of (i) at least one of a current mass of the motor vehicle, an engine creep torque, a driving resistance, and a mass moment of inertia of the motor vehicle, and (ii) at least one part of the motor vehicle.

7. The method of claim 1, wherein the braking effect is automatically canceled completely after a specific time interval.

8. A computer readable medium for a regulating unit of a brake system of a motor vehicle having a computer program executable by a processor, comprising:
- a program code arrangement having computer program code for operating a brake system of a motor vehicle by performing the following:
  - activating a brake to provide a braking effect when an activation condition exists; and
  - reducing the braking effect when a deactivation condition exists;
  - wherein at least one property of the reduction of the braking effect at least intermittently is a function of a longitudinal inclination of the motor vehicle in order to influence a rolling away of the motor vehicle, this property being determined such that the motor vehicle displays a predictable and reproducible roll-away behavior.

9. An electrical storage medium for a control unit of a brake system of a motor vehicle having a computer program executable by a processor, comprising:
- a program code arrangement having computer program code for operating a brake system of a motor vehicle by performing the following:
  - activating a brake to provide a braking effect when an activation condition exists; and
  - reducing the braking effect when a deactivation condition exists;
  - wherein at least one property of the reduction of the braking effect at least intermittently is a function of a longitudinal inclination of the motor vehicle in order to influence a rolling away of the motor vehicle, this property being determined such that the motor vehicle displays a predictable and reproducible roll-away behavior.

10. A control unit of a brake system for a motor vehicle, comprising:
- a computer readable medium having a computer program executable by a processor, including:
  - a program code arrangement having computer program code for operating a brake system of a motor vehicle by performing the following:
    - activating a brake to provide a braking effect when an activation condition exists; and
    - reducing the braking effect when a deactivation condition exists;
    - wherein at least one property of the reduction of the braking effect at least intermittently is a function of a longitudinal inclination of the motor vehicle in order to influence a rolling away of the motor vehicle, this property being determined such that the motor vehicle displays a predictable and reproducible roll-away behavior.

11. A motor vehicle having a brake system, comprising:
- a control unit of the brake system having a computer readable medium having a computer program executable by a processor, including:
  - a program code arrangement having computer program code for operating the brake system of a motor vehicle by performing the following:
    - activating a brake to provide a braking effect when an activation condition exists; and
    - reducing the braking effect when a deactivation condition exists;
    - wherein at least one property of the reduction of the braking effect at least intermittently is a function of a longitudinal inclination of the motor vehicle in order to influence a rolling away of the motor vehicle, this property being determined such that the motor vehicle displays a predictable and reproducible roll-away behavior.

12. The method of claim 1, wherein the dependence is represented by a parabolic characteristics curve.

* * * * *